March 11, 1958 V. P. FRIBERG ET AL 2,826,697
MULTI-BAND TUNER
Filed Aug. 5, 1953 5 Sheets-Sheet 1

INVENTOR.
VINCENT P. FRIBERG.
SIDNEY TEPPER.
BY Ward, Neal, Haselton,
Orme & McElhannon
ATTORNEYS.

March 11, 1958 V. P. FRIBERG ET AL 2,826,697
MULTI-BAND TUNER
Filed Aug. 5, 1953 5 Sheets-Sheet 2

INVENTORS.
VINCENT P. FRIBERG
SIDNEY TEPPER.
BY Ward, Neal, Haselton,
Orme & McElhannon
ATTORNEYS.

March 11, 1958  V. P. FRIBERG ET AL  2,826,697
MULTI-BAND TUNER

Filed Aug. 5, 1953  5 Sheets-Sheet 3

INVENTORS.
VINCENT P. FRIBERG.
SIDNEY TEPPER.
BY Ward, Neal, Haselton,
Orme & McElhannon
ATTORNEYS.

March 11, 1958  V. P. FRIBERG ET AL  2,826,697
MULTI-BAND TUNER
Filed Aug. 5, 1953  5 Sheets-Sheet 4

INVENTORS.
VINCENT P. FRIBERG.
SIDNEY TEPPER.
BY Ward, Neal, Haselton
Orme & McElhannon
ATTORNEYS.

March 11, 1958     V. P. FRIBERG ET AL     2,826,697
MULTI-BAND TUNER Filed Aug. 5, 1953     5 Sheets-Sheet 5

INVENTORS.
VINCENT P. FRIBERG.
BY SIDNEY TEPPER.
Ward, Neal, Haselton,
Orme & McElhannon
ATTORNEYS.

United States Patent Office 2,826,697
Patented Mar. 11, 1958

2,826,697

MULTI-BAND TUNER

Vincent P. Friberg, Lyndhurst, N. J., and Sidney Tepper, New York, N. Y., assignors, by mesne assignments, to General Instrument Corporation, Newark, N. J., a corporation of New Jersey Application August 5, 1953, Serial No. 372,415

13 Claims. (Cl. 250—40)

This invention relates to a multi-band tuner and more particularly to apparatus for tuning a plurality of circuits over two relatively wide frequency bands which may be immediately adjacent or separated.

Multi-band tuners find particular application in the radio frequency section of a television receiver. Because of the manner in which the frequencies for television transmitters have been allocated in the United States, the radio frequency section of a television receiver must be tunable over at least two relatively wide frequency bands which are widely separated. It is highly desirable that a tuner for such use provide a maximum gain over both bands and the same selectivity at any setting within the band. Furthermore, these requirements should be met without complicated mechanical arrangements and with a small number of components so that the tuner will not only be reliable but also inexpensive.

For various reasons including ease of replacement and the critical positioning and arrangement of components required at the high frequencies employed, it is customary to manufacture the radio frequency section of a television receiver as a separate unit which is mounted on a chassis carrying the remaining apparatus of the receiver, and the tuner of our invention is also so constructed. In addition, it is made of such a size that it will fit within the space occupied by other types of tuners now in use and it is provided with the conventional controls accessible to the user, namely, channel selection and fine tuning. If desired, the tuner is provided with a detent mechanism for the channel selecting shaft, but the tuner of the invention may also be continuously tuned.

Because of the electrical performance characteristics and the frequencies involved, it has not been possible to provide a satisfactory tuner for television receivers which employs capacity tuning similar to that in conventional broadcast receivers. Certain prior art tuners employ different sets of coils for each television channel and a relatively large number of switching contacts which are operated each time a station is selected. Such tuners have the disadvantages that a large number of coils are required, the contacts affect the performance and cause difficulties during use and the operator must overcome the switch friction each time a channel is changed. Other types of prior art tuners have required complicated mechanical drives which are expensive and do not maintain resettability and which may, for example, change rotational movement of the tuning shaft to a critical linear movement of the frequency changing element or elements.

The multi-band tuner of our invention employs the tuning device set forth in Patent No. 2,648,824 and includes a plurality of hollow, toroidal coil forms preferably mounted co-axially and formed from two separate similar halves. A pair of coils is mounted on each form, or if desired, a single coil which preferably has different characteristics in different sections thereof is mounted on each form. Toroidal cores of magnetic material are mounted within the forms and are supported thereby and slidable therein, the cores having a different permeability in different peripheral portions thereof. Although the cores may be made of different magnetic materials in different peripheral portions thereof to obtain the peripheral differences in permeability, it is preferred that they be made of the same magnetic material throughout their major periphery and that a coating of a material, such as silver, having a conductivity which is greater than that of the body of the core to be provided on the core, the coating extending only partially around the major periphery of the core. This latter construction has the advantage that a high Q is obtained regardless of the position of the cores and that the cores are simple to manufacture. The cores are rotated by common tuning means for changing the resonant frequency of the coils, and the cores are adjustable with respect to the tuning means to permit individual adjustment of the resonant frequency of any particular coil. Also, the coil forms and hence the coils are adjustable as a unit to permit shifting of the tuning of all coils simultaneously.

The tuning means of the tuner of our invention also operates a multiple switch which is operated only when the band in which the tuner is to operate is changed. The tuning means may be continuously variable and may include a reduction drive or it may be controlled by a detent mechanism for positively selecting the various channels.

It is an object of our invention to provide a multi-band tuner which is simple and inexpensive to manufacture but which is reliable in operation and has good electrical characteristics.

It is a further object of our invention to provide a multi-band tuner which may be varied either continuously or in steps without complicated mechanical arrangements.

Other objects and advantages of our invention will be apparent from the detailed description of the invention given hereinafter by way of example only and setting forth the manner in which we now prefer to practice the invention and from the accompanying drawings, in which:

Figure 1:
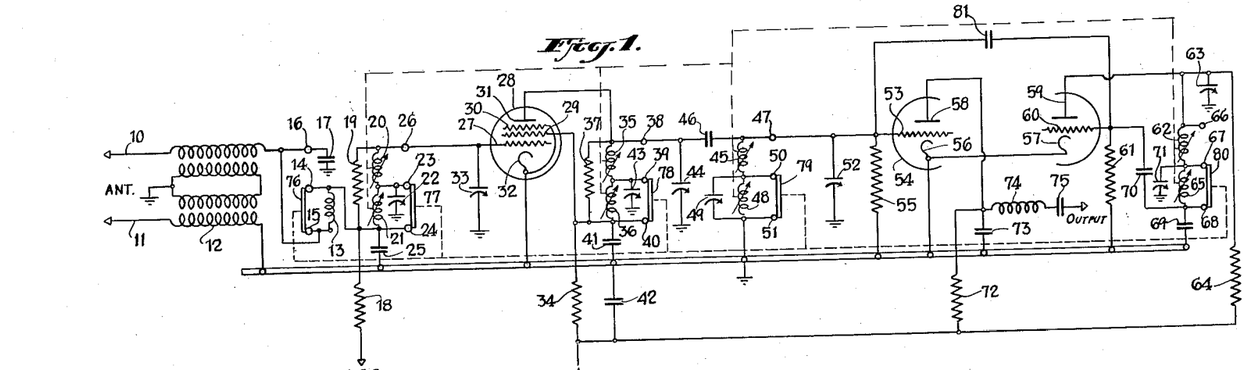
Fig. 1 is a circuit diagram illustrating one manner in which the tuner of the invention may be employed.
Figure 2:
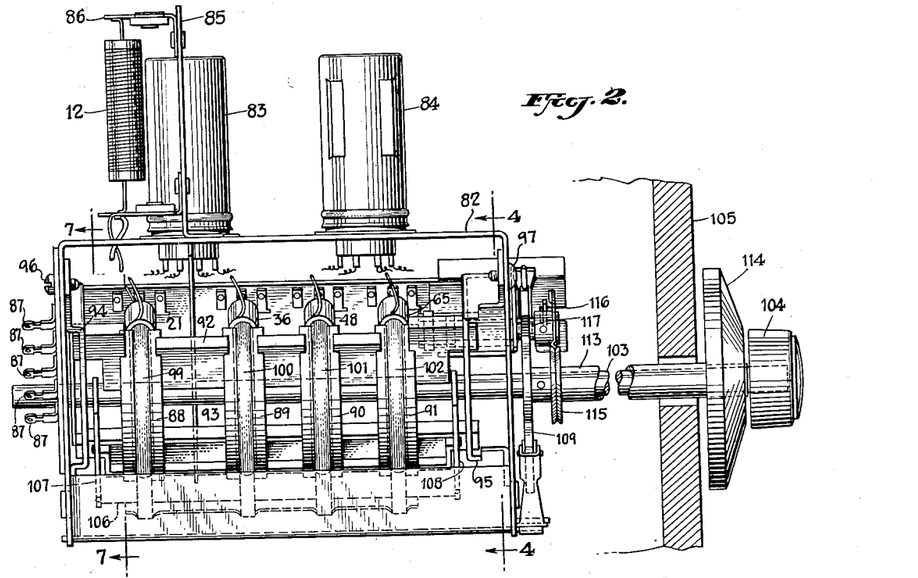
Fig. 2 is a side elevation view of the multi-band tuner of our invention.

As stated above, the tuner of our invention is particularly useful as part of the radio frequency section of a television receiver but, of course, it will be understood that the tuner may be used for other purposes. Fig. 1 is a circuit diagram of a radio frequency amplifier and converter which may form the radio frequency section of a television receiver and in which the tuner of our invention may be employed. Referring to Fig. 1, the antenna leads are connected to the lines 10 and 11 which in turn are connected to a balanced-unbalanced transformer 12. The transformer 12 is also connected to ground and to one end of a coupling coil 13. A pair of contacts 14 and 15 are connected to opposite ends of the coil 13 and a third contact 16 is connected through a capacitor 17 to ground. One end of the coil 13 is also connected to the junction point between a resistor 18 and a resistor 19, the resistor 18 being a decoupling resistor which is connected in a conventional manner to a source of gain control potential for the purpose of automatically controlling the gain of the radio frequency amplifier in accordance with the received signal strength in a well-known manner.

Resistor 19 is connected in parallel with a pair of coils 20 and 21, coil 20 being a high band coil of relatively low inductance and coil 21 being a low band coil of relatively high inductance. Coil 21 is connected to a trimmer capacitor 22 and is connected at its ends to contacts 23 and 24. Also, one end of coil 21 is connected through a capacitor 25 to ground.

It will be noted that coils 20 and 21 are connected in series and the contact 23 is connected to the junction point between the coils 20 and 21. The opposite end of coil 20 is connected to a contact 26 and to grid 27 of a pentode tube 28 having the conventional screen grid 29, shield grid 30, anode 31 and cathode 32. Cathode 32 is heated by conventional means not shown. Control grid 27 is connected to ground through a trimmer capacitor 33 and the cathode 32 is also connected to ground.

The screen grid 29 is connected to a source of energizing potential through resistor 34 and the anode 31 is connected through coils 35 and 36 to resistor 37 to the same source of potential. Coil 35 is the high band coil and coil 36 is the low band coil, coil 35 having a lower inductance than coil 36. One end of coil 35 is connected to a contact 38 and the junction point between coils 35 and 36 is connected to a contact 39. The opposite end of coil 36 is connected to a contact 40 and is connected through a radio frequency by-pass capacitor 41 to ground. The source of potential is also by-passed for radio frequencies to ground by a capacitor 42. The junction point between coils 35 and 36 is connected to ground through a trimmer capacitor 43 and the end of coil 35 connected to contact 38 is connected to ground through a trimmer capacitor 44.

The anode 31 of tube 28 is coupled to one end of high band coil 45 through a coupling capacitor 46, the end of coil 45 also being connected to a contact 47. Coil 45 is connected in series with a low band coil 48 which is shunted by a trimmer capacitor 49 and the junction point between coils 45 and 48 is connected to a contact 50, whereas the opposite end of coil 48 is connected to contact 51. The end of coil 45 connected to the contact 47 is also connected to ground through a trimmer capacitor 52.

The upper end of coil 45 is also connected to a grid 53 of a double triode 54, the grid 53 being connected to ground through a resistor 55. The double triode 54 has a pair of cathodes 56 and 57 which are also connected to ground and has a pair of anodes 58 and 59. The cathodes 56 and 57 are heated in a conventional manner. The portion of the double triode 54 including the cathode 56, grid 53 and anode 58 acts as a mixer or converter tube, whereas the portion of the double triode 54 comprising cathode 57, anode 59 and grid 60 acts as an oscillator tube for providing a signal of hetero-dyning frequency to the mixer grid 53.

The grid 60 is connected to ground through a resistor 61 and energy at the oscillation frequency is coupled to the grid 53 by a coupling capacitor 81. The anode 59 is connected to one end of a high band coil 62 and to one end of a trimmer capacitor 63, the other end of which is connected to ground. The anode 59 is also connected to the source of potential through a resistor 64.

The high band coil 62 is connected in series with a low band coil 65 and one end of the coil 62 is connected to a contact 66 and the junction point between the coils 62 and 65 is connected to a contact 67. The opposite end of coil 65 is connected to a contact 68 and is connected through a capacitor 69 to ground and through a capacitor 70 to a grid 60. The junction point of coils 62 and 65 is connected through a trimmer capacitor 71 to ground.

The anode 58 is connected through a resistor 72 to the source of potential and is by-passed to ground for signals above the intermediate frequency of the receiver through a capacitor 73. The signals at the intermediate frequency are coupled through the choke 74 and the capacitor 75 to the intermediate frequency amplifier of the receiver.

The tube 28 with its associated circuits operates to amplify the elevision signals received over the leads 10 and 11, the circuits being selective so as to amplify only signals within a predetermined band to which the circuits have been tuned and corresponding to a selected television channel. The oscillator portion of the tube 54 with its associated circuits provides signal energy at a frequency such that when mixed with the incoming signals produces signals at the output of the mixer circuit which are within the intermediate frequency band of the receiver.

The various contacts heretofore referred to form part of a switching means having a movable member carrying the wipers 76, 77, 78, 79 and 80. In the circuit of Fig. 1 the movable member and hence the wipers are in a position such that the tuner operates in the high frequency band. Thus, the wiper 76 short-circuits the coil 13 and the low band coils 21, 36, 48 and 65 are effectively out of the circuit because they are shunted respectively by the wipers 77, 78, 79 and 80. Therefore, the high band tuning of the input and output circiuts of the amplifier may be controlled by varying the inductance of the coils 20 and 35, the tuning of the input of the mixer may be controlled by varying the tuning of the coil 45 and the frequency of the oscillator may be controlled by varying the inductance of the coil 62.

Of course, the tuning of the various circuits is also affected by the stray capacities and the setting of the trimmers 33, 44, 52 and 63, but once the circuits have been installed and adjusted the tuning in the high frequency band is controlled by the operator only by varying the inductance values of the coils 20, 35, 45 and 62. As will be described hereinafter, the inductance values of the coils 20, 35, 45 and 62 are varied by rotating toroidal magnetic cores having different permeabilities in different peripheral portions thereof.

Referring to Figs. 2-6, the tuner of our invention includes a frame 82 on which the tubes 28 and 54 are mounted within the shield cans 83 and 84. The transformer 12 is also mounted on the frame 82 by means of a bracket 85. The antenna leads may be connected to the terminals 86 and terminals 87 are provided for supplying suitable heater and energizing potentials to the tubes and for supplying the automatic gain control voltage.

The coils 20 and 21, 35 and 36, 45 and 48, and 62 and 68 are mounted respectively on coil forms 88, 89, 90 and 91. The coil forms 88-91 are mounted on supports 92 and 93 which are supported at their ends by brackets 94 and 95 mounted on the frame 82. The brackets 94 and 95 are held on the frame 82 by any suitable fastening means, such as the screws 96, 97 and 98 and a further screw not shown in the drawing, these screws being threaded into the ends of the brackets 94 and 95 and passing through holes in the frame 82. The holes through which the screws at one end of the brackets 94 and 95 pass are made larger than the external diameter of the screws so that the brackets 94 and 95 are adjustable with respect to the frame 82 permitting the supports 92 and 93 to be rotated about the axis of the coil forms 88-91 and hence permitting simultaneous rotation of the coils mounted on the coil forms about the axis of the coil forms 88-91 for the purpose of shifting the coils with respect to the toroidal magnetic cores 99, 100, 101 and 102 slidably supported within the coil forms 88-91. Movement of all the coils simultaneously shifts the frequency of operation of all the circuits by a predetermined amount.

A shaft 103 is mounted co-axially with the forms 88-91 which, it will be noted, are co-axial with each other and this shaft 103 may be rotated by a knob 104 mounted externally of a panel 105 or by any conventional driving means. The shaft 103 is connected to the cores 99-102 by a cross bar 106 mounted at the ends of a pair of S-shaped brackets 107 and 108, the S-shaped brackets being connected at their opposite ends to the shaft 103 and therefore rotating therewith. The shaft 103 is used for coarse tuning or channel selection. Rotation of the shaft 103 causes the cross bar 106 to rotate about the axis of the shaft 103 and hence about the axis of the coil forms 88-91 and changes the positions of the cores 99-102 with respect to the coils mounted on the forms 88-91. The cores 99-102, as described hereinafter, have different permeabilities in different peripheral portions thereof so that the inductance values of the cores mounted on the forms 88-91 are changed as the cores are rotated.

The shaft 103 is provided with a detent wheel 109 which has a plurality of notches 110 on the periphery thereof. A roller 111 mounted on a spring arm 112 is supported from the frame 82 and rides on the periphery of the wheel 109. As the detent wheel 109 is rotated, the roller 111 drops into the notches 110 as they pass underneath the roller 111 and makes it necessary to apply an increased amount of force to the shaft 103 to cause the shaft 103 to rotate after the roller 111 has entered a notch 110. Furthermore, the arm 112 has sufficient tension to cause the wheel 109 to assume a predetermined position with respect to the roller 111 when the roller 111 is in one of the notches 110. Thus, if the notches 110 are spaced properly, they may be used to indicate the position of the shaft 103 required to select a particular television channel and the roller 111 causes the wheel 109 to assume a position such that the circuits are tuned substantially to the selected channel.

If continuous tuning of the circuits is desired and the action of the detent is considered unnecessary, the roller 111 and the arm 112 may be omitted. Also, in this event, notches 110 may be omitted.

Figure 5:
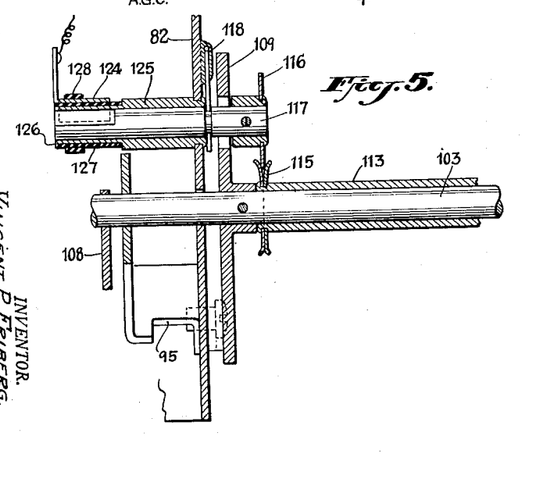
Fig. 5 is a side elevation, fragmentary view partly in cross section of the tuning shaft and the fine tuning control of the tuner shown in Fig. 2.

Since it is difficult to provide sufficiently accurate tuning by use of the mechanism heretofore described for controlling the position of the cores 99-102, a fine tuning control is also provided. The fine tuning control includes a cylindrical hollow shaft 113 mounted on the shaft 103 and rotatable by the knob 114. A pulley 115 formed by two flexible discs is mounted on shaft 113 and is rotatable therewith. The pulley 115 engages a disc 116 which drives the shaft 117 of a variable capacitor which will be described hereinafter in further detail. The shaft 117 controls the value of the capacitor 63 shown in Fig. 1 and hence controls the frequency of the oscillator, such control being sufficient for fine tuning purposes. The shaft 117 is held in the desired position by a U-shaped spring 118 which is secured to the frame 82 and encircles the shaft 117 providing a braking action on the shaft 117.

The detent wheel 109 is provided with slots 119 and 120 which permit the detent wheel 109 and hence the shaft 103 to be rotated through at least 180 degrees. However, the ends of the slots abut the shaft 117 at the extreme ends of the rotation of the detent wheel 109 and, therefore, limit the rotation of the wheel 109 and the shaft 103 to the desired amount.

Figure 6:
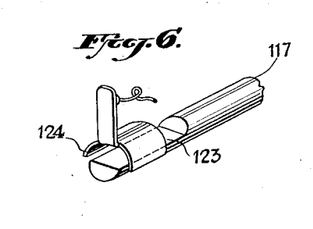
Fig. 6 is a perspective view of a portion of the fine tuning control shown in Fig. 5.

As shown in Figs. 5 and 6, one plate of the capacitor 63 shown in Fig. 1 is formed by the shaft 117 which has a flat portion 123 and hence is semi-cylindrical in one portion thereof. The other plate of the capacitor 63 is formed by the semi-cylindrical shell 124 mounted adjacent the semi-cylindrical portion of the shaft 117. As the shaft 117 is rotated from the position shown, the spacing between the semi-cylindrical portion and the shell 124 decreases causing the capacity of the capacitor to increase.

The shaft 117 is rotatably mounted within a tube 125 secured to the frame 82. The tube 125 has a reduced portion 126 around which is provided a tube 127 of insulating material. The shell 124 is mounted on the tube 127 and is held thereon by a ring 128 of insulating material.

Figures 3, 4:
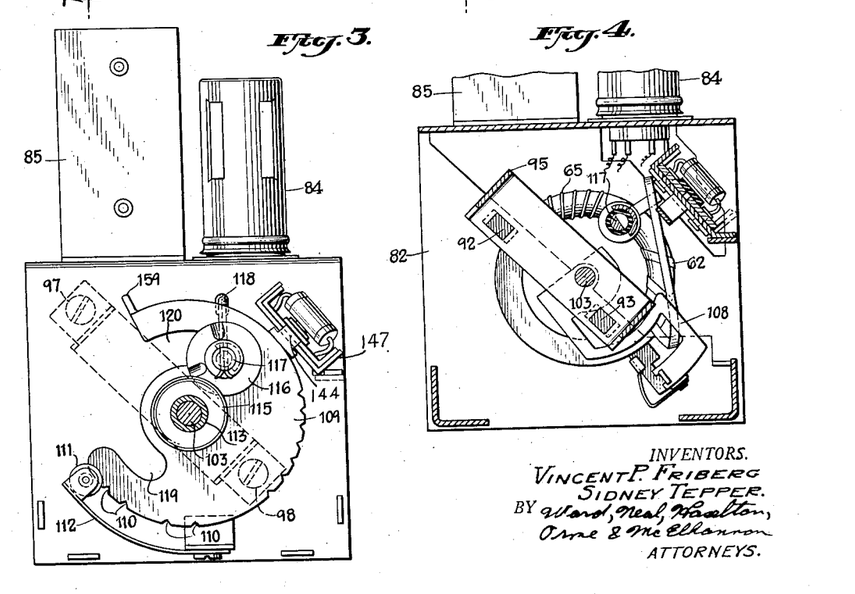
Fig. 3 is a front end view partly in cross section of the tuner shown in Fig. 2.
Fig. 4 is a cross-sectional view of the tuner shown in Figs. 2 and 3 and is taken along the line 4—4 indicated in Fig. 2.

Preferably, the supports 92 and 93 engage oppositely disposed portions of the coil forms 88-91 so that the coil forms will be rigidly held in their respective positions. Such rigidity is required in order to prevent movement of the coil forms during rotation of the shaft 103 and hence in order to prevent changes in the frequency to which the coils are tuned due to movement of the coil forms. However, when the supports 92 and 93 are so mounted with respect to the coil forms, some provision must be made to connect the shaft 103 with the cores 99-102 which would also permit at least 180 degrees of movement of the shaft 103 without striking the supports 92 and 93. In accordance with our invention, the brackets which interconnect the shaft 103 with the cross bar 106, the cross bar 106 being connected to the cores 99-102, are S-shaped so that in one extreme position of the shaft 103 one of the supports, such as the support 93, is received within the S-shaped bracket as shown in Fig. 4, and in its other extreme position the other of the supports is received within a different portion of the S-shaped bracket. Furthermore, it will be noted that the portions of support 93 which are received within the brackets 107 and 108 are nearer to the shaft 103 than the portions of support 92 which are received within the brackets.

Figure 7:
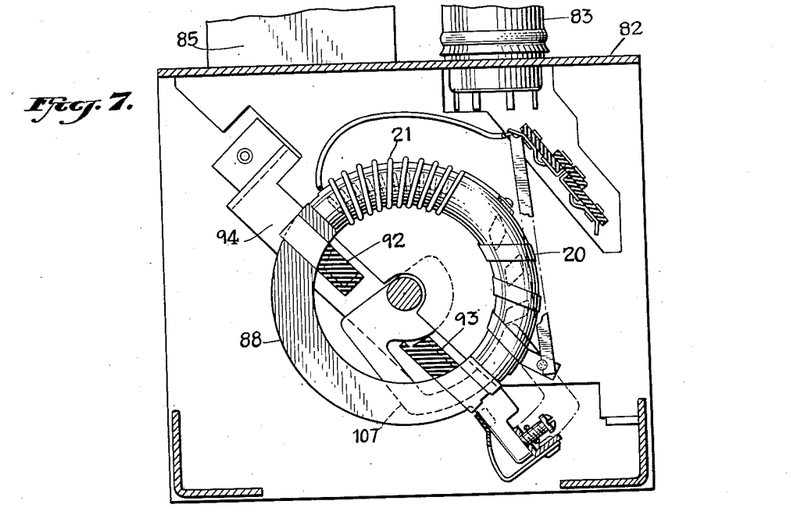
Fig. 7 is a cross-sectional view of the tuner shown in Fig. 2 and is taken along the line 7—7 indicated in Fig. 2.
Figures 8, 9, 10, 11:
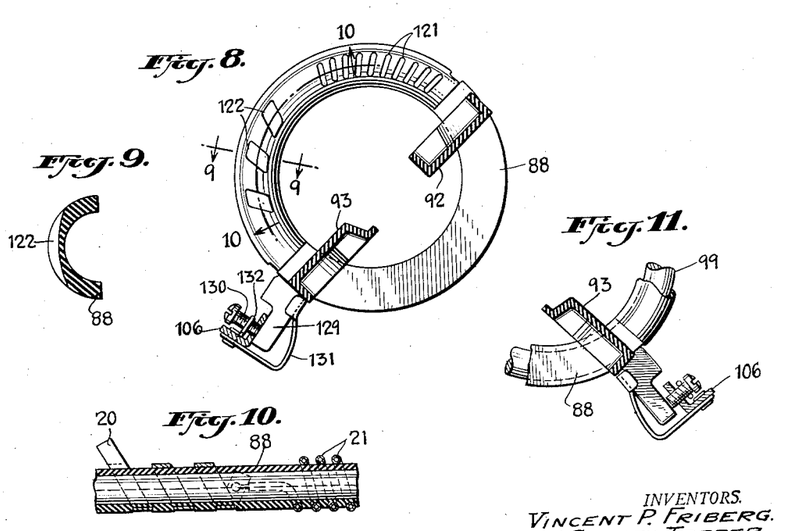
Fig. 8 is an end view of a portion of the tuner shown in Fig. 2 and illustrates one of the coil forms and a portion of the apparatus used to rotate the cores employed in the tuner.
Fig. 9 is a cross-sectional view of one of the parts of the coil form shown in Fig. 8 and is taken along the line 9—9 indicated in Fig. 8.
Fig. 10 is a further cross-sectional view of the coil forms shown in Fig. 8 with a pair of coils mounted thereon and is taken along the line 10—10 indicated in Fig. 8.
Fig. 11 is a fragmentary view partly in cross section of the coil form and core-rotating apparatus shown in Fig. 8.
Figure 12:
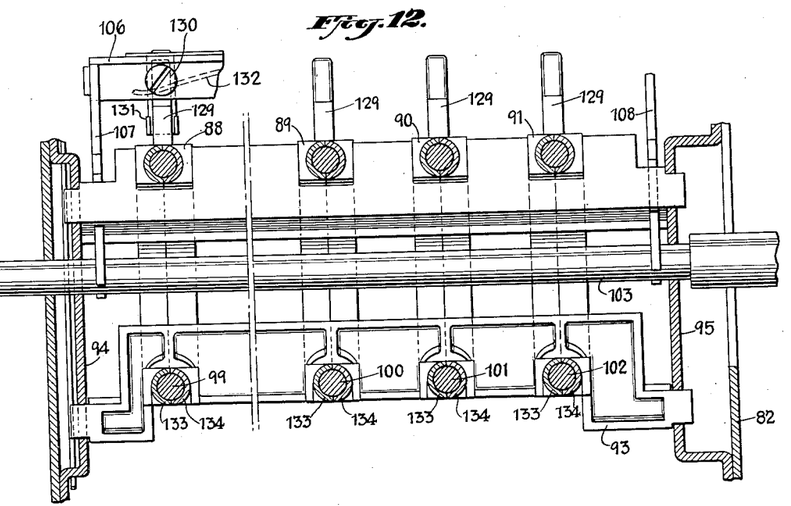
Fig. 12 is a side view partly in cross section of a portion of the tuner shown in Fig. 2 and illustrates the coil forms, the supports therefor, the cores and the mounting brackets for the supports.

Referring to Figs. 7-11, the high band coils in all of the circuits are substantially the same as high band coil 20 shown in these figures and the low band coils are also substantially the same as the low band coil 21. In Fig. 7 the coils 20 and 21 are shown mounted on the coil form 88. When the frequency bands are widely separated, as they are under present-day television standards, the coils 20 and 21 are preferably wound with different sizes of wire and have a different pitch. Thus, coil 21 is formed by several turns of a small-gauge wire, whereas coil 20 is formed by fewer turns of a conductor having a fairly large surface area, such as a thin strip of copper. The coil form 88, as well as the other coil forms, are preferably provided with slots or grooves 121 and 122 therein into which the conductors of the coils 20 and 21 will fit so that the coils are wound in the correct position and are maintained in such correct position. Of course, the coils 20 and 21 may be considered as a single coil having different characteristics throughout its length and, if the frequency bands and the performance requirements are such as to permit such a construction, the same wire may be used for both coils 20 and 21 and the pitch of the winding may be the same throughout the length of the coil or may be varied in different portions thereof for the purpose of obtaining the desired tuning characteristics.

For tracking and adjustment purposes it is desirable that each of the toroidal cores 99—102 be adjustable about its axis with respect to the other cores. Each of the cores may be connected to the cross bar 106 in any suitable manner but preferably, in order to provide the desired adjustment, each of the cores is provided with an arm such as the arm 129 molded integrally with the core and the arm is connected to the cross bar 106 by means of a screw 130 which engages the threaded walls of an aperture in the cross bar 106 and which engages one face of the arm 129. The opposite face of the arm 129 is engaged by a spring 131 which is secured to the cross bar 106 and which presses the arm 129 against the end of the screw 130. Thus, by rotation of the screw 130 it is possible to rotate the core 99 to which the arm 129 is attached about its axis and change the inductance of the coils 20 and 21 even though the shaft 103 and the other cores are stationary. If desired or found to be necessary, the screw 130 may be maintained in its adjusted position by means of a resilient rod or wire 132.

As pointed out above, one of the important requirements of a multi-band tuner is that it be stable and re-settable close to a desired frequency. Thus, the coils should be rigidly mounted and the toroidal cores should be accurately re-settable to the same position each time that the roller 111 engages a notch 110 in the detent wheel 109 and the cores should closely follow the same paths with respect to the coils each time that the cores are rotated. In accordance with a further feature of our invention, the coil forms which support and hence which position the coils are also employed to guide the toroidal cores which are slidably supported by the forms.

Referring to Figs. 12—16, each of the coil forms 88—91 is made from a suitable low-loss synthetic resin such as a high temperature polystyrene, which is molded as shown in Figs. 12—16. Preferably, each coil form such as the coil form 88 is formed from two identical halves 133 and 134. The coil form 88 is formed in this manner not only because it closely fits the toroidal core 99, but also because it is simpler to manufacture. As shown, the coil form 88 has the shape of a hollow toroid and when the two halves 133 and 134 are assembled about the core 99, the form 88 closely fits the core 99 and prevents any substantial deviation of the core from a predetermined path which is fixed with respect to the coils which are mounted on the form 88. The supports 92 and 93 for the coil forms are provided with apertures 135 and 136 therein which receive oppositely disposed portions of the coil forms and hold the two halves 133 and 134 of the coil forms together. Grooves 137 and 138 are provided in the coil forms and the walls of the groove engage the sides of the forms 92 and 93 and prevent rotation of the coil form. Although, if the fit between the supports 92 and 93 and the coil forms is adequately tight, the halves 133 and 134 will be maintained in their proper positions, nevertheless, it is preferable that the halves be cemented together along the abutting portions thereof.

Each of the coil forms is provided with a slot 139 therein extending along the major periphery of the form so as to permit the arm 129 of the toroidal core to extend therethrough and be engaged by the cross bar 106. The slot 139 preferably extends along the major periphery of the coil form a distance sufficient to permit at least 180 degrees of rotation of the core. If desired the portions of the coil form 88 adjacent the slot 139 may be omitted, making the form 88 semi-toroidal in shape, but preferably the form 88 has the shape of a complete toroid in order to provide greater rigidity and in order to assist in guiding the arm 129.

Figures 13, 14, 15, 16:
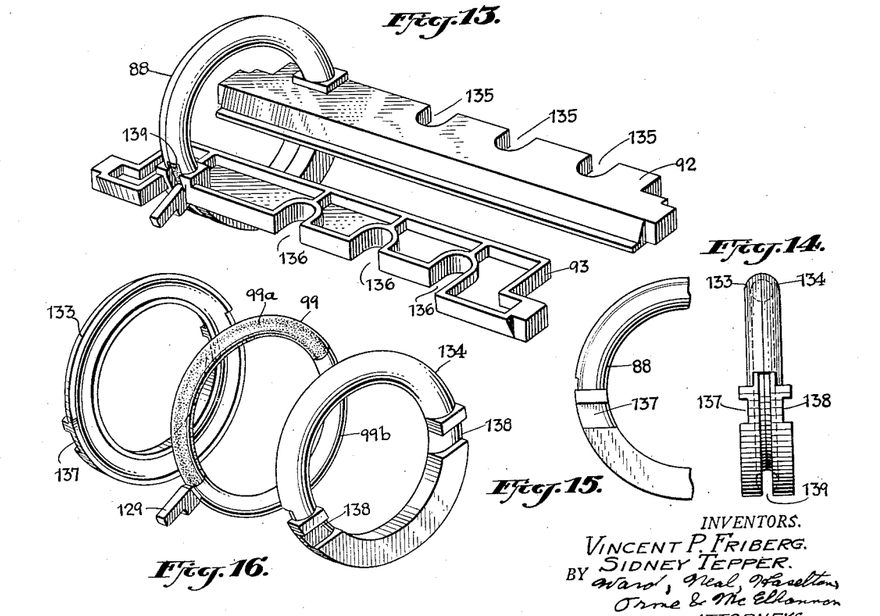
Fig. 13 is a perspective view of a portion of the apparatus shown in Fig. 12 and illustrates one of the coil forms mounted on the supports therefor.
Fig. 14 is a side view partly in cross section of the coil forms shown in Figs. 12 and 13.
Fig. 15 is a fragmentary end view of the coil form shown in Fig. 14.
Fig. 16 is a perspective exploded view of the coil form shown in the preceding figures and a toroidal core which is mounted within such coil forms.
Figure 17:
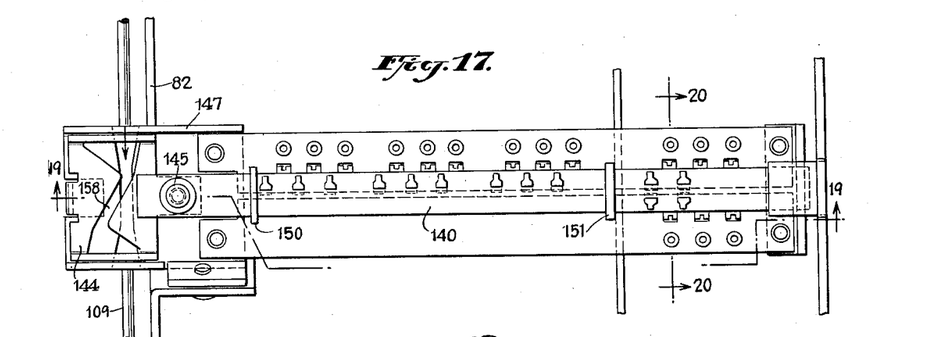
Figs. 17 and 18 are top and bottom views, respectively, of switching means for changing bands and forming part of the tuner shown in Fig. 2.
Figure 18:
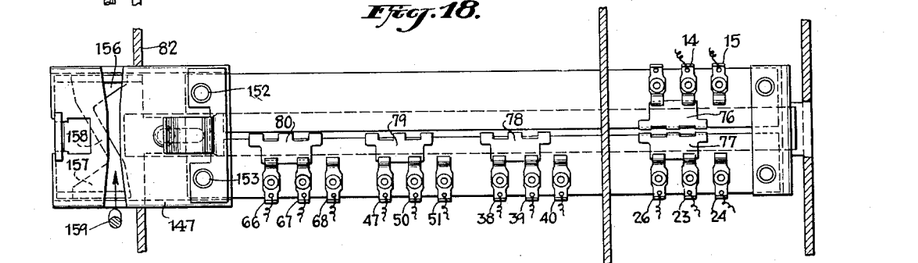
Figure 19:
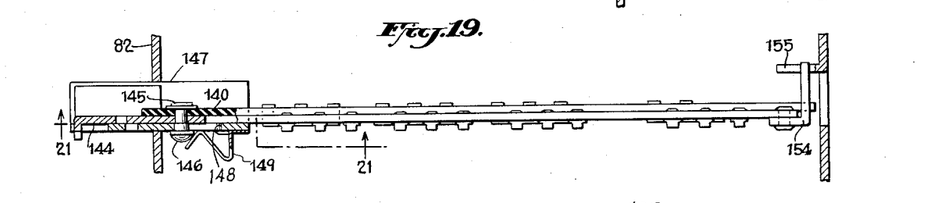
Fig. 19 is a cross-sectional view of the switching means shown in Figs. 17 and 18 and is taken along the line 19—19 indicated in Fig. 17.
Figure 20:
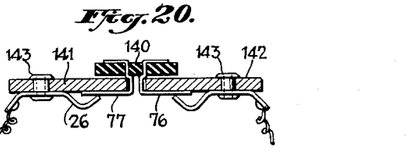
Fig. 20 is a cross-sectional view of the switching means shown in Figs. 17-19 and is taken along the line 20—20 indicated in Fig. 17.
Figure 21:
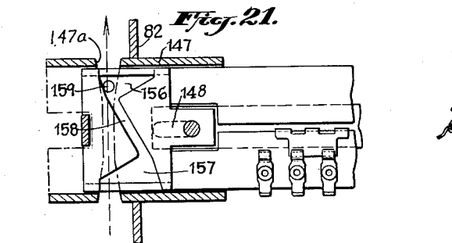
Fig. 21 is a fragmentary view, partly in cross section and similar to Fig. 18, and is taken along the line 21—21 indicated in Fig. 19.

As stated above, the cores have different permeabilities in different peripheral portions thereof so as to provide the desired tuning of the circuits. Thus, as shown in Fig. 16, the portion 99a of core 99 which is shown stippled in the drawing has a permeability which is different from the permeability of the portion 99b and, in order to provide the greatest tuning range, portions 99a and 99b preferably extend equal distances around the major periphery of the core 99. Also, as pointed out above, the portion 99a is preferably provided with a different permeability by coating the body of the core 99 with a material such as silver which has greater conductivity than the body of the core in the manner set forth in Patent No. 2,666,187. The body of the core is made of a magnetic material such as powdered iron molded under heat and pressure with a low-loss synthetic resin. It will be apparent to those skilled in the art that other types of magnetic materials may be employed, but preferably the magnetic material extends throughout the entire major periphery of the core.

The coils on the coil forms are so disposed as to occupy substantially one-half of the major periphery of the coil forms and hence to extend along substantially one-half of the major periphery of the cores. As long as the portion of the core being moved through the coils has the same permeability, the inductance values of the coils are not affected by rotation of the cores, but as soon as a portion of the core having a different permeability enters the coil which is effective in the circuit, the inductance value of the coil changes either to a smaller or larger value depending upon the change in permeability and, thus, by rotating a core of the type described above and shown in Fig. 16, the inductance value of the surrounding coils may be continuously varied by rotating the core. For a more detailed description of the positioning and effect of the cores, reference is made to the above-mentioned Patent No. 2,648,824.

A further important feature of our invention is the provision of switching means which effectively disconnects one of the coils or a portion of the coil from the circuit when the band at which the tuner operates is changed. Referring to Figs. 4, 7 and 17–21, it will be seen that the switching means includes a plurality of contacts designated by the numerals employed in Fig. 1 to designate these contacts, which contacts are mounted along a line extending parallel to the axis of the coil forms 88—91. The switching means is also provided with a plurality of wipers designated by the numerals employed in connection with Fig. 1 and these wipers are mounted on a member 140 which is movable in a direction parallel to said axis of said coil forms and, in the embodiment shown, to the axis of the shaft 103. The contacts and the wipers are made of thin, resilient sheet metal riveted or otherwise secured to two strips of insulating material 141 and 142, the wipers being secured to the member 140 by passing portions thereof through apertures in the member 140 by bending over the ends of the portions and the contacts being secured to stationary insulating strips 141 and 142 by rivets 143.

Member 140 is provided at the end thereof with a plate 144 which is secured to the member 140 by any suitable fastening device and preferably by a rivet 145 having a rounded head 146. The plate 144 rides in a U-shaped bracket 147 secured to the frame 82 and the head 146 of the rivet 145 extends through a slot 148 in the bracket 147. A spring arm 149 is secured to the bracket 147 and engages the head 146 of the rivet 145 to hold the member 140 in either of two positions, the two positions corresponding to those in which the high band coils and, alternatively, the low band coils are effective. Thus, for example, in a first position of the member 140, such as the position shown in Figs. 17–19, the high band coils are short-circuited, whereas in the second position of the member 140 indicated in Fig. 21 the low band coils are short-circuited.

The member 140 is guided at its forward end by the plate 144 and by a U-shaped clip 150 secured to the insulating strips 141 and 142. At its rearward end the member 140 is guided by the U-shaped clip 151 also secured to the insulating strips 141 and 142. At their forward ends the insulating strips 141 and 142 are secured to the bracket 147 such as by rivets 152 and 153 and at their reaward ends the strips 141 and 142 are secured to an L-shaped member 154 which is secured to an ear 155 struck-up from the frame 82. The strips 141 and 142 may be individual strips, but preferably they form the arms of a single U-shaped piece as shown.

The plate 144 has a slot therein which is wider at its ends 156 and 157 than at its intermediate portion 158. The walls of the slot 156—158 form a cam surface which engages a portion of the detent wheel 109 in the form of a pin 159 extending therefrom. The intermediate portion 158 extends at an angle to a plane extending transversely of the axis of the coil forms 88—91 and hence to the axis of the shaft 103 and, when the walls of the intermediate portion 158 are engaged by the pin 159, the member 140 is moved from its first position to its second position or vice versa depending upon the direction of rotation of the wheel 109, and hence the shaft 103. A slot 147a is also provided in bracket 147 to permit the pin 159 to extend therethrough. The slot in the plate 144 has the wider portions 156 and 157 at the ends thereof so that in the event the member 140 is accidentally displaced from its proper position the pin 159 may enter the slot and cause the member 140 to move to a position which is correctly related to the portion of the arc of rotation of the pin 159.

From the above, it will be seen that during one portion of the rotation of wheel 109 the member 140 is in a first position but when the pin 159 reaches a position such that it engages the slot portion 158, the member 140 is moved into a second position. After the pin 159 passes through the slot, the member 140 remains at rest but the wheel 109 and the shaft 103 may be further rotated. In this manner, for example, the circuits may be tuned from the low end to the high end of the low frequency band and then when the high end of the low frequency band is reached the low frequency band coils are switched out of the circuit so that only the high frequency band coils are effective. As the rotation of the shaft 103 is continued in the same direction, the circuits are tuned over the high frequency band. Conversely, the circuits may be tuned from the high end to the low end of the high frequency band and when the low end of the high frequency band is reached the member 140 is moved causing the high frequency band coils to become ineffective and causing the low frequency band coils to become effective. As the rotation of the shaft 103 is continued in the same direction, the circuits will continue over the low frequency band.

The pin 159 on the wheel 109 is so related with respect to the position of the plate 144 that the member 140 is not moved until the portions of the cores of different permeability are entering or are about to enter the coils which are to be rendered effective. Thus, as the shaft 103 is rotated to increase the nominal frequency to which the circuits are tuned, the member 140 is not moved until the coating on the portion 99a of the cores is entering or is about to enter within the high band coils. Conversely, as the nominal frequency of the circuits is lowered, the member 140 is not moved from one position to another until the portion 99b of the cores is entering or is about to enter the low band coils.

It will be seen from the above that the switching means is operated only when it is desired to change the bands through which the tuner is being tuned and it is not necessary to operate the switching means each time that a channel is selected. Accordingly, the wearing of the contacts is considerably reduced and it is necessary to apply a force to the shaft 103 sufficient to operate the switching means only during a small fraction of the sector of rotation of the shaft 103. Accordingly, the channel selector is easily and more readily operated, and since the wipers of the switching means may be relatively large because only a small number of contacts is employed and only two switching positions are required, the positioning of the wipers and hence the member 140 is not critical. With the contacts arranged in a line as shown, they may be positioned closely adjacent the coils with which they are associated and, therefore, circuit interaction and the inductance and capacity of conductors other than those actually wound about the coil forms may be kept to a minimum.

Having thus described our invention with particular reference to the preferred form thereof and having shown and described certain modifications, it will be obvious to those skilled in the art to which the invention pertains, after understanding our invention, that various changes and other modifications may be made therein without departing from the spirit and scope of our invention, as defined by the claims appended thereto.

What is claimed as new and desired to be secured by Letters Patent of the United States is:

1. A multi-band tuner comprising a plurality of hollow, toroidal coil forms mounted co-axially, each of said forms having a slot therein extending along the major periphery thereof a predetermined distance; a supporting frame; a pair of supports for said forms mounted on said frame, said supports being mounted in engagement with oppositely disposed portions of said forms and having apertures therein to receive said portions; a plurality of toroidal cores of magnetic material, each core having a coating thereon which is of greater conductivity than the body of the core and said coating extending partially around the major periphery of said core, said cores each having an arm thereon extending radially outward and being mounted within said forms, one in each form, with the arm of each core extending through the slot in its associated form; a pair of coils mounted on each said form, one of said coils having a lower inductance than the other; a rigid cross bar connected to the arms of said cores; a tuning shaft mounted on said frame; a pair of S-shaped brackets connected at their ends to spaced portions on said cross bar and movable by said shaft for causing said cross bar and said cores to rotate about the axis of said cores, one of said supports for said coil forms having at least one portion nearer to said shaft than a corresponding portion of the other of said supports and said portions being alternately received within said brackets during rotation of said shaft; detent means connected to said frame and said shaft for positioning said shaft; switching means mounted on said frame adjacent said coils, said switching means having contacts electrically connected to the ends of said coils and having wipers movable in a direction substantially parallel to the axis of said forms, said switching means having a plurality of contacts for each pair of coils, said contacts being connected to the ends of said coils and said wipers in a first position interconnecting a pair of said contacts and in a second position disconnecting said pair of contacts; driving means connected to said wipers for moving all said wipers at the same time; and cam means interconnecting said driving means and said shaft and driven by said shaft during a predetermined portion of the rotation of said shaft for moving said wipers from said second to said first position substantially when said coating on said cores enters said coils of lower inductance.

2. A multi-band tuner comprising a plurality of hollow, toroidal coil forms mounted co-axially, each of said forms having a slot therein extending along the major periphery thereof a predetermined distance and each being formed by two similar halves; a supporting frame; a pair of supports for said forms adjustably mounted on said frame, said supports being mounted in engagement with oppositely disposed portions of said forms and having apertures therein to receive said portions and retain said halves in assembled relation; a plurality of toroidal cores of magnetic material, each core having a coating thereon which is of greater conductivity than the body of the core and said coating extending substantially half-way around the major periphery of said core, said cores each having an arm thereon extending radially outward and located at one end of said coating and said cores being mounted within said forms, one in each form, with the arm of each core extending through the slot in its associated form, each said slot being of a length sufficient to permit at least 180 degrees of movement of an associated core; a pair of series-connected coils mounted on each said form, one of said coils having a lower inductance than the other; a rigid cross bar adjustably connected to the arms of said cores; a tuning shaft mounted on said frame co-axially with said cores; a pair of S-shaped brackets connected at their ends to spaced portions on said cross bar and on said shaft for causing said cross bar and said cores to rotate about said shaft, one of said supports for said coil forms having at least one portion nearer to said shaft than a corresponding portion of the other of said supports and said portions being alternately received within said brackets during rotation of said shaft; detent means connected to said frame and said shaft for positioning said shaft; switching means mounted on said frame adjacent said coils, said switching means having contacts electrically connected to the ends of said coils and having wipers movable in a direction substantially parallel to the axis of said forms, said switching means having three contacts for each pair of coils, one contact being connected to the connected ends of said coils and the other contacts being connected to the opposite ends of said coils and said wipers in a first position interconnecting said one contact with one of said other contacts and in a second position interconnecting said one contact with the other of said other contacts; cam means connected to said wipers for moving all said wipers at the same time, said cam means comprising a plate having a slot therein which is wider at both ends than the intermediate portion thereof, said intermediate portion of said slot extending at an angle to a plane perpendicular to said shaft; and cam operating means driven by said shaft and comprising a member rotatable with said shaft and having a portion thereof engageable with said plate and extending into said slot during a predetermined portion of the rotation of said shaft whereby said wipers are moved from said first to said second position substantially when said coating on said cores enters said coils of lower inductance.

3. In a multi-band tuner, a hollow, toroidal coil form having a slot therein extending along the major periphery thereof a predetermined distance, a toroidal core mounted within said form and slidably supported therein, said core having an arm extending therefrom and through said slot, and means for rotating said core comprising a member in adjustable engagement with said arm.

4. In a multi-band tuner, a fixed supporting base, a hollow, toroidal coil form having a slot therein extending along the major periphery thereof a predetermined distance, said form comprising a pair of identical halves and being mounted on said base, a toroidal core of magnetic material mounted within said form and slidably supported therein, said core having an arm extending therefrom and through said slot, and means for rotating said core comprising a member movably mounted on said base and having an adjustable screw and a spring thereon, said screw and spring opposing one another and said arm being interposed therebetween, said screw engaging said arm on one side thereof and said spring engaging said arm on the opposite side thereof.

5. A tuner comprising a plurality of tuneable circuit elements each having a fixed part and a movable part, a supporting frame, a pair of supports for said fixed circuit element parts mounted on said frame, said supports being mounted in engagement with separated portions of said fixed circuit element parts, a drive member operatively connected to each of said movable circuit element parts, a tuning shaft mounted on said frame, a pair of S-shaped brackets operatively connected to spaced portions of said drive member and rotatable about an axis by said shaft for causing said drive member and said movable tuning element parts to move, one of said supports for said fixed circuit element parts having at least one portion nearer to said bracket axis than a corresponding portion of the other of said supports and said portions being alternately received within said brackets during rotation of said shaft.

6. A tuner comprising a plurality of hollow toroidal coil forms mounted coaxially, each of said forms having a slot therein extending along the major periphery thereof a predetermined distance, a supporting frame, a pair of supports for said forms mounted on said frame, said supports being mounted in engagement with separated portions of said forms, a plurality of toroidal cores of magnetic material, said cores each having an arm thereon extending radially outward and being mounted within said forms, one in each form, with the arm of each core extending through the slot in its associated form, a drive member operatively connected to each of said arms on said cores, a tuning shaft mounted on said frame, a pair of S-shaped brackets operatively connected to spaced portions of said drive member and rotatable about an axis by said shaft for causing said drive member and said cores to move, one of said supports for said forms having at least one portion nearer to said bracket axis than a corresponding portion of the other of said supports and said portions being alternately received within said brackets during rotation of said shaft.

7. The tuner of claim 6, in which each of said forms is made of two similar halves, said supports having apertures therein which receive portions of both halves of each form so as to retain said halves in assembled relation.

8. The tuner of claim 7, in which said drive member comprises a plurality of sets of arm-engaging parts, each set for a given arm, each set comprising a pair of opposed elements at least one of which is adjustably positionable relative to said drive member and the other of which is movable relative thereto, said arms being respectively received between and engaged by a pair of said elements.

9. The tuner of claim 6, in which each of said cores has a coating thereon which is of greater conductivity than the body of the core, said coating extending partially around the major periphery of said core, said arms on said cores being located at one end of said coating.

10. The tuner of claim 9, in which said drive member comprises a plurality of sets of arm-engaging parts, each set for a given arm, each set comprising a pair of opposed elements at least one of which is adjustably positionable relative to said drive member and the other of which is movable relative thereto, said arms being respectively received between and engaged by a pair of said elements.

11. The tuner of claim 6, in which each of said forms is made of two similar halves, said supports having apertures therein which receive portions of both halves of each form so as to retain said halves in assembled relation, and in which each of said cores has a coating thereon which is of greater conductivity than the body of the core, said coating extending partially around the major periphery of said core, said arms on said cores being located at one end of said coating.

12. The tuner of claim 11, in which said drive member comprises a plurality of sets of arm-engaging parts, each set for a given arm, each set comprising a pair of opposed elements at least one of which is adjustably positionable relative to said drive member and the other of which is movable relative thereto, said arms being respectively received between and engaged by a pair of said elements.

13. In a tuner, a fixed supporting base, a hollow toroidal coil form having a slot therein extending along the major periphery thereof a predetermined distance, said form being mounted on said base, a toroidal core of magnetic material mounted within said form and slidably supported therein, said core having an arm extending therefrom and through said slot, and means for rotating said core comprising a member movably mounted on said base and having a pair of opposed elements at least one of which is adjustably positionable relative thereto and the other of which is movable relative thereto, said arm being received between and engaged by said elements.

References Cited in the file of this patent

UNITED STATES PATENTS

| | | | |
|---|---|---|---|
| 2,304,761 | Harvey | Dec. 8, | 1942 |
| 2,457,816 | Grimm | Jan. 4, | 1949 |
| 2,497,747 | Valdettaro | Feb. 14, | 1950 |
| 2,521,968 | DeTar et al. | Sept. 12, | 1950 |
| 2,534,768 | Hall | Dec. 19, | 1950 |
| 2,648,824 | Friberg | Aug. 11, | 1953 |
| 2,650,298 | Thias et al. | Aug. 25, | 1953 |